(12) United States Patent  (10) Patent No.: US 9,028,351 B1
Rodriguez  (45) Date of Patent:  May 12, 2015

(54) CHAIN CLEANING AND LUBRICATING DEVICE

(71) Applicant: Radames Rodriguez, Greenacres, FL (US)

(72) Inventor: Radames Rodriguez, Greenacres, FL (US)

( * ) Notice: Subject to any disclaimer, the term of this patent is extended or adjusted under 35 U.S.C. 154(b) by 142 days.

(21) Appl. No.: 13/787,527

(22) Filed: Mar. 6, 2013

Related U.S. Application Data

(60) Provisional application No. 61/607,256, filed on Mar. 6, 2012.

(51) Int. Cl.
  *B08B 3/04*  (2006.01)
  *F16H 57/05*  (2006.01)
  *B62J 31/00*  (2006.01)

(52) U.S. Cl.
  CPC  *F16H 57/05* (2013.01); *B62J 31/00* (2013.01)

(58) Field of Classification Search
  CPC ....... B62J 31/00; F16N 2210/33; F16H 57/05
  USPC .......................................................... 474/91
  See application file for complete search history.

(56) References Cited

U.S. PATENT DOCUMENTS

| | | | |
|---|---|---|---|
| 4,009,764 A * | 3/1977 | Hafner | .......................... 184/15.2 |
| 4,120,380 A | 10/1978 | Mann | |
| 4,578,120 A | 3/1986 | Chiarella | |
| 4,593,923 A | 6/1986 | Thalmann | |
| 5,020,637 A | 6/1991 | Hoenselaar et al. | |
| 5,213,180 A | 5/1993 | Masonek et al. | |
| 5,343,588 A * | 9/1994 | Chen | ............................ 15/256.5 |
| 5,443,139 A | 8/1995 | Scott | |
| 5,484,038 A * | 1/1996 | Rowell | ......................... 184/15.1 |
| 5,595,262 A * | 1/1997 | Martin | ......................... 184/15.2 |
| 5,647,456 A | 7/1997 | Gelb | |
| 5,934,411 A * | 8/1999 | Murano et al. | ............... 184/11.5 |
| 6,257,369 B1 * | 7/2001 | Pesl | ............................. 184/15.1 |
| 6,942,409 B2 * | 9/2005 | Barbieri | ......................... 401/10 |
| 8,181,747 B2 * | 5/2012 | Feldstein | ..................... 184/15.1 |
| 8,511,436 B2 * | 8/2013 | Feldstein | ..................... 184/15.1 |
| 8,636,114 B2 * | 1/2014 | Feldstein | ..................... 184/15.1 |
| 2010/0101607 A1 | 4/2010 | Feldstein | |
| 2012/0204902 A1 * | 8/2012 | Petersen | .......................... 134/6 |

* cited by examiner

*Primary Examiner* — Michael Mansen
*Assistant Examiner* — Michael Riegelman
(74) *Attorney, Agent, or Firm* — H. John Rizvi; Gold & Rizvi P.A.

(57) ABSTRACT

A chain cleaning and lubricating device for use with chain driven vehicles, such as motorcycles. The chain cleaning and lubricating device includes a lubrication reservoir for storing chain lubricant, a lubrication applicator, and a control lever that is attachable to the handlebars of a motorcycle. A control cable operatively connects the control lever to a control valve that is operatively situated within the lubrication reservoir. The chain cleaning and lubricating device is affixed to a sprocket housing mounted to the frame of the motorcycle. The lubrication applicator includes a plurality of bristles that extend downward from the bottom surface of the lubrication reservoir to continuously engage the rotating chain of the motorcycle to remove debris from the chain. The control lever is selectively operated to regulate the flow of chain lubricant from the lubrication reservoir to the chain of the motorcycle.

15 Claims, 5 Drawing Sheets

CHAIN CLEANING AND LUBRICATING DEVICE

CROSS-REFERENCE TO RELATED APPLICATION

This application claims the benefit of U.S. Provisional Patent Application Ser. No. 61/607,256 filed on Mar. 6, 2012 which is incorporated herein in its entirety.

FIELD OF THE INVENTION

The present invention relates generally to lubricating devices. More particularly, the present disclosure relates to a chain cleaning and lubricating device for use with chain driven vehicles such as motorcycles. The chain cleaning and lubricating device includes a lubrication reservoir, a plurality of bristles defining a cleaning and lubricant applicator positioned to engage the chain of a motorcycle, and a controller that is selectively operated to deliver chain lubricant to the chain.

BACKGROUND OF THE INVENTION

Many chain driven vehicles such as scooters, mopeds, and motorcycles typically include a drive chain for powering the vehicles in a forward direction. A chain driven vehicle with an improperly maintained drive chain can result in damage to the vehicle, and possible injury to the vehicle operator. Drive chains are often exposed to contaminants such as dirt, and mud that accumulate between interconnecting links of the chain, and moisture that causes the chain to corrode and rust. Operating off-road motorcycles on dirt roads or trails typically results in the drive chain being exposed to greater amounts of contaminants. Over time, neglected care of the chain can reduce the life of the chain and create a safety hazard unless routine maintenance is performed to maintain the chain in good, operating condition.

Maintaining the drive chain in a healthy operating condition requires proper cleaning and lubrication. Lubricating the chain is often undertaken while the motorcycle is stationary. Such a task is traditionally accomplished by raising the motorcycle onto a wheel stand, placing the motorcycle in neutral, and simultaneously rotating the rear wheel with one hand while applying a lubricant onto the drive chain with the other hand using an oil dispenser such as an oil or spray can. Subsequent to applying the lubricant onto the chain, excessive lubricant is generally wiped away using a rag, in an effort to remove any contaminants from the chain. Such methods are relatively straight-forward for most chain driven machines such as motorcycles. The task generally requires lifting, and the coordinated functionality of both hands, or alternatively, the assistance of another individual. Though the preferred method of lubricating the drive chain of a motorcycle is while the motorcycle is stationary, some motorcycle riders prefer to lubricate the chain while riding the motorcycle. Typically, the operator holds a spray can in one hand and attempts to lubricate the chain by pointing the spray nozzle towards the vicinity of the chain while simultaneously negotiating the motorcycle on the road. Steering the motorcycle with one hand while attempting to lubricate the chain of the motorcycle with another is dangerous, inefficient, and does not adequately remove contaminants from the chain.

Various prior art devices have been introduced to aid operators in cleaning and lubricating the drive chain of motorcycles, scooters, or mopeds. One prior art device includes bristles that are fixed along a hub of a rotating wheel where the bristles engage the drive chain to remove any debris and contaminants collected on the chain. Such prior art devices do not include a method of lubricating the drive chain of a motorcycle. Another prior art device comprises a cylindrical housing including a rigid brush having a plurality of bristles formed within the housing, and an opening for receiving the chain of a motorcycle during operation. The bristles engage the chain as the chain passes through the housing to remove contaminants from the chain. A tube is connected to a pressurized lubricating spray applicator where the tube extends into the cylindrical housing. One drawback of this prior art device is that the cleaning and lubricating process is efficiently completed when the motorcycle is in a stationary position.

Conventional cleaning and lubricating devices are not engineered to lubricate the chain of motorcycles simultaneously while operating the motorcycle on a paved road, race track, or dirt trail. Traditional cleaning and/or lubrication devices for chain driven vehicles require that the vehicle be stationary. The coordinate efforts of placing the vehicle in a stationary position before lubricating the chain is often less desirable, time consuming, and inconvenient. For example, in some situations, operators wish to clean and lubricate the chain of the motorcycle while operating the motorcycle at high speeds such as on a race track. The ability to clean and lubricate the chain while riding the motorcycle is convenient, requires little effort, and effectively and continuously maintains the chain in good operating condition.

SUMMARY OF THE INVENTION

The present invention overcomes the deficiencies of the known art and the problems that remain unsolved by providing a chain cleaning and lubricating device configured for use with chain driven vehicles such as motorcycles. The chain cleaning and lubricating device is attached to a sprocket housing mounted onto the motorcycle, and includes a lubrication reservoir, a plurality of bristles defining a cleaning and lubricant applicator that is positioned to continuously engage the chain of a motorcycle, and a controller operated to deliver chain lubricant to the chain of the motorcycle when the motorcycle is stationary or moving.

In accordance with one implementation of the present invention, there is provided a chain cleaning and lubricating device comprising:
  a lubrication reservoir for containing a liquid lubricant, where the lubrication reservoir includes a first aperture having a removable closure, a cable aperture, and a lubrication aperture formed on a lower end of the lubrication reservoir;
  a control valve arranged within the lubrication reservoir to openly close the lubrication aperture;
  a lubrication applicator including a plurality of rigid bristles, where the lubrication applicator is aligned with the lubrication aperture to direct the liquid lubricant downwards, by gravity, along the plurality of rigid bristles when the control valve is opened; and
  a control cable having a distal end connected to a control lever, and a proximal end extending through the cable aperture and a bias member, and attached to the control valve, where the control lever is selectively operated to provide releasable tension on the control cable to openly close the control valve to provide controlled release of the liquid lubricant from the lubrication reservoir.

In an aspect, the control valve comprises any one of a pivoting motion, a rotational motion, a sliding motion, or a vertical up and down motion.

In another aspect, the bias member is disposed within the lubrication reservoir and comprises a spring having a first end attached to the control valve, and a second end engaging an internal perimeter of the cable aperture.

In another aspect, the lubrication applicator is either attached to a lower surface of the control valve, or to a lower surface of the lubrication reservoir in coaxial alignment with the lubrication aperture.

In another aspect, the chain cleaning and lubricating device is attached to a sprocket housing designed to cover a chain and drive sprocket of a motorcycle, where the sprocket housing is attached to the motorcycle such that the plurality of rigid bristles are oriented at a point where the chain interfaces with the drive sprocket and where the plurality of rigid bristles are in continuous engagement with the chain.

In another aspect, the control lever comprises a hand operated lever securely attachable to handlebars of the motorcycle, or a foot operated lever.

In another aspect, the lubrication reservoir comprises a translucent or transparent material to permit viewing of the liquid lubricant within the lubrication reservoir.

In accordance with another implementation of the present invention, there is provided a chain cleaning and lubricating device attached to a sprocket housing including mounts for removable attachment to a frame of a motorcycle and positioned to cover a drive sprocket and a chain of said motorcycle, said chain cleaning and lubricating device comprising;
- a lubrication reservoir defining an interior volume for containing a chain lubricant, and including a fill aperture having a removable closure, a cable aperture, and an exit aperture;
- a control valve operatively disposed within the lubrication reservoir to openly close the exit aperture;
- a lubrication applicator including a plurality of bristles coaxially aligned with the exit aperture to direct chain lubricant downwards, by gravity, along the plurality of bristles when the control valve is operated to allow the chain lubricant to pass through the exit aperture;
- a control lever attachable to handlebars of the motorcycle; and
- a control cable having a distal end connected to the control lever, and a proximal end extending through the cable aperture and a bias member, and attached to the control valve, where the control lever is selectively operated to provide releasable tension on the control cable to openly close the control valve and provide controlled release of chain lubricant from the lubrication reservoir.

In another aspect, the chain cleaning and lubricating device further includes a cable seal having an opening for receiving the control cable there through where the cable seal is inserted within the cable aperture.

In accordance with another implementation of the present invention, there is provided a chain maintenance system for a chain having interconnecting links that interface with a drive sprocket of chain driven vehicles, said chain maintenance system comprising:
- a receptacle including a fill aperture having a removable closure, a cable aperture, and a lubrication aperture, where the receptacle is defined by a body having a top and bottom and an interior volume for storing a liquid lubricant;
- a valve operatively disposed within the receptacle and oriented to openly close the lubrication aperture;
- a plurality of bristles aligned with the lubrication aperture to direct the liquid lubricant downwards, by gravity, along the plurality of bristles when the valve is opened permitting the liquid lubricant to flow through the lubrication aperture;
- a control lever attachable to one of the chain driven vehicles;
- a control cable having a first end connected to the control lever, and a second end extending through the cable aperture and a bias member, and coupled to the valve, said control lever selectively operated to provide releasable tension on the control cable to operate the valve and provide controlled dispensing of liquid lubricant from the receptacle, via the lubrication aperture; and
- wherein the receptacle is affixed to a sprocket housing that is attached to a frame of one of the chain driven vehicles such that the plurality of bristles are oriented at a point where the chain interfaces with the drive sprocket and where the plurality of bristles are in continuous engagement with the chain.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
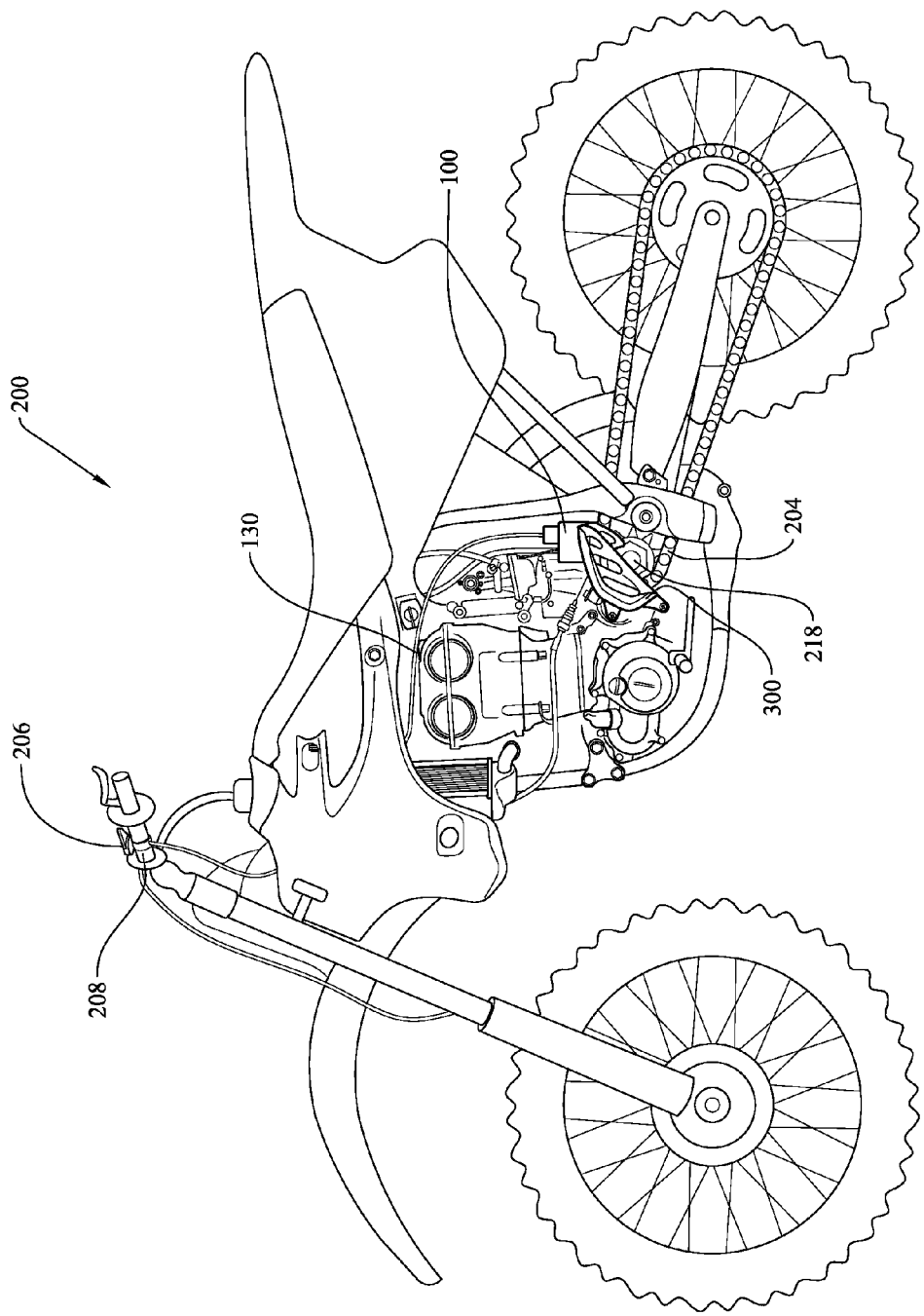
FIG. 1 presents an elevated side view of a motorcycle including a chain cleaning and lubricating device installed on a sprocket housing shown attached to the motorcycle frame along the front sprocket and chain engagement area.

The present invention is directed to a chain cleaning and lubricating device 100 for use with chain driven vehicles including, but not limited to, motorcycles, scooters, mopeds, all-terrain vehicles (ATV's), bicycles, go-carts, or any other machinery having a drive chain system. An exemplary installation of the chain cleaning and lubricating device 100 of the present invention is illustrated in FIG. 1. The chain cleaning and lubricating device 100 is affixed on a sprocket housing 202, 300 of a motorcycle 200. In one embodiment, sprocket housing 202, 300 comprise a guard that is mounted to the frame of the motorcycle along a front region where chain 204 engages with a front sprocket 218. Sprocket housing 202, 300 may come in a variety of different shapes and designs as described further below. A control cable 130 extends from the chain cleaning and lubricating device 100, with a distal end connected to a control lever 206, and a proximal end coupled to a control valve 138 that is enclosed within lubricant reservoir 110, as better illustrated in FIG. 3. Control lever 206 is preferably installed in arms reach on handlebars 208, of motorcycle 200, and is selectively operated to dispense a chain lubricant onto chain 204.

Figure 2:
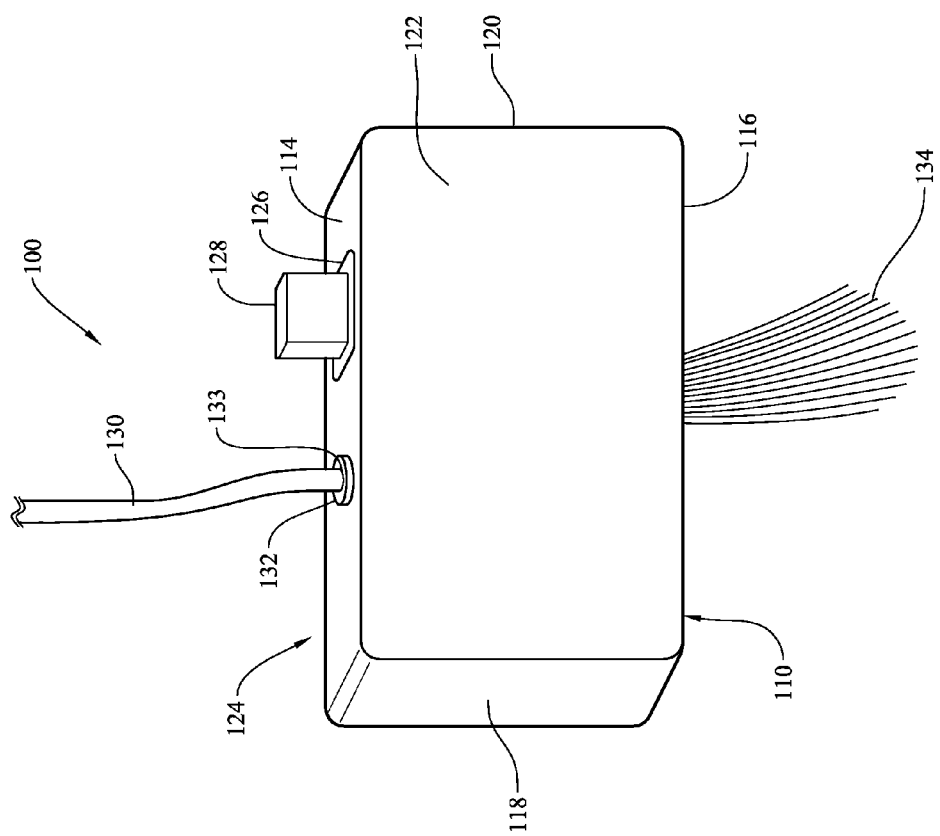
FIG. 2 presents a perspective view of the chain cleaning and lubricating device.
Figure 3:
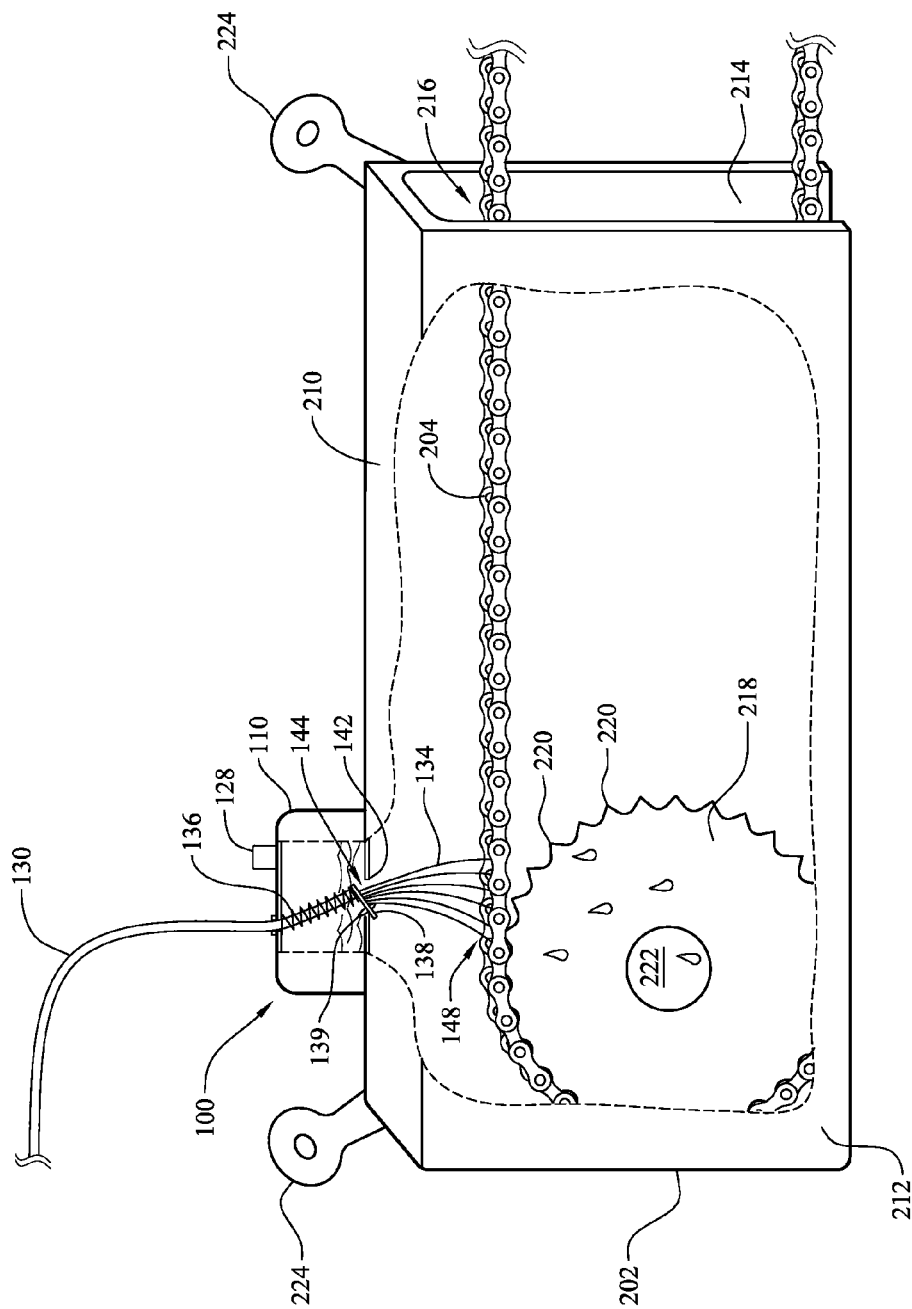
FIG. 3 presents a partially sectioned, isometric front view of the chain cleaning and lubricating device mounted on a sprocket housing shown as a partially sectioned front view.
Figure 4:
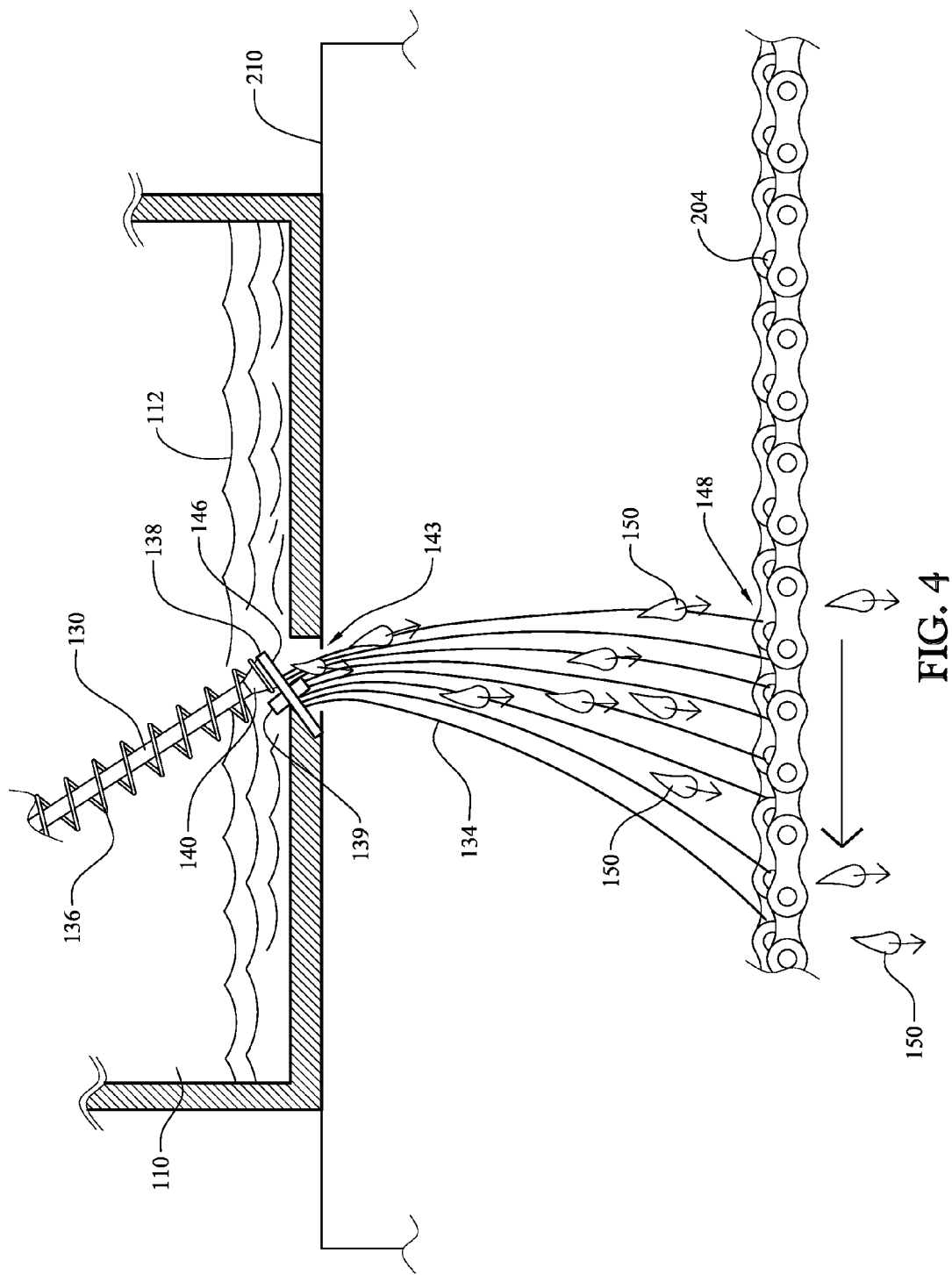
FIG. 4 presents a partial, cross-sectional side view of the chain cleaning and lubricating device engaging a chain of the motorcycle.

With reference made to FIGS. 2 through 4, the chain cleaning and lubricating device 100 includes a lubrication reservoir 110 having an internal volume for storing a chain lubricant 112. The chain lubricant 112 may be selected from a variety of different lubricants available on the market for cleaning and lubricating chains of chain driven vehicles. In a preferred embodiment, lubrication reservoir 110 includes four sidewalls 114, 116, 118, 120, a front wall 122, and a back wall 124, and is constructed from a durable, metal or plastic material. For added convenience, lubrication reservoir 110 may be constructed from a transparent or translucent material, or include a level indicator (not shown) to enable visual inspection of the volume of chain lubricant 112 contained within the lubricant reservoir 110. Lubrication reservoir 110 may comprise any geometrical shape tailored for providing compact installation when mounted onto a chain driven vehicle such as motorcycle 200.

A fill aperture 126 having a size sufficient for receiving chain lubricant 124 is formed through one sidewall 114 of lubrication reservoir 110. A reservoir cap 128 is provided to seal the fill aperture 126 to prevent dirt, dust, and debris from entering the lubrication reservoir 110, and to retain the chain lubricant 112 within the lubrication reservoir 110. The reservoir cap 128 may comprise any well-known sealing device including a threaded closure, a frictional fitting, a rubber plug, or a cap having a bayonet connection. In one alternative embodiment, reservoir cap 128 may include a dip stick (not shown) mounted on the lower surface of the reservoir cap 128 and used to measure the volume of lubricant in the lubrication reservoir 110. Reservoir cap 128 may also comprise antistatic properties.

A cable aperture 132 is formed within sidewall 114, of lubrication reservoir 110, to enable passage of a control cable 130 therein. A cable seal 133 is preferably provided to seal the cable aperture 132 opening to prevent dust or debris from entering the cable aperture 132, and to secure and align the control cable 130 when extending through the cable aperture 132. Cable seal 133 may comprise a flat rubber seal, or a plug having an opening for receiving control cable 130 there through. A proximal end of control cable 130 extends through a biasing member 136, such as a spring, and attaches to a control valve 138, via a cable connector 140, as better illustrated in FIGS. 3 and 4. In one embodiment, control cable 130 comprises a solid or braided cable that is enclosed within an outer rubber or plastic sheath or sleeve. Biasing member 136 is configured to provide a compression force on control valve 138 to releasably retain the control valve 138 in a closed position covering a lubricant exit hole 142 that is formed within a bottom sidewall 116 of lubrication reservoir 110. Control lever 206 is selectively operated to create a tension force on control cable 130 to overcome the compression force applied by biasing member 136, forcing control valve 138 to pivot in an open position allowing chain lubricant 112 to pass through lubricant exit hole 142 and flow downwards by gravity along the plurality of bristles of the lubrication applicator 134. Conversely, releasing control lever 206 reduces the tension force applied on control cable 130, enabling biasing member 136 to force the control valve 138 in a closed position covering lubricant exit hole 142 and preventing any lubricant 112 from exiting the lubrication reservoir 110. In one embodiment, control valve 138 is pivotably mounted to a lower sidewall 116 of reservoir 110 via, a control valve pin 139. It is understood that control valve 138 may be oriented and operated via, a pivoting motion, a rotational motion, a sliding motion, or a vertical up and down motion.

With continued reference made to FIGS. 2 through 4, chain cleaning and lubricating device 100 includes a lubrication applicator 134 for engaging with, and cleaning and lubricating chain 204. In the exemplary embodiment, lubrication applicator 134 is defined as having an attachment end 144 affixed to a lower surface 146 of control valve 138, and an application end 148 for continuously engaging the surface of chain 204. Lubrication applicator 134 may be attached to the lower surface of control valve 138 using any attachment process, technique or fastener known by those skilled in the art. For example, lubrication applicator 134 may be attached to the lower surface 146 of control valve 138 using welding techniques, a bonding agent, a mechanical fastener, or a heat bonding process. In one embodiment, the lubricating applicator 134 is releasably attached to the lower surface 146 of the control valve 138 to easy replace a used lubricating applicator 134 with a new one.

In a preferred embodiment, lubrication applicator 134 comprises a plurality of rigid bristles constructed from a material that is conducive to convey a chain lubricant 112. Each of the plurality of bristles may include any geometric shape, size and dimension. For example, each of the plurality of bristles may comprise a solid or hollow body allowing chain lubricant 112 to flow along the outer surface of each bristle. The plurality of bristles is designed to continuously clean and remove debris or contaminants from the surface of the chain 204, and to direct the flow of chain lubricant 112 onto chain 204 when control lever 206 is activated.

The chain cleaning and lubricating device 100 is preferably mounted to sprocket housing 202, 300 using any well-known fastening or bonding technique. As illustrated in FIG. 3, in one embodiment, sprocket housing 202 includes a housing top wall 210 that is integrally joined to a housing front cover 212, and a housing back cover 214 defining a chain opening 216 for receiving the chain 204 of a motorcycle. Sprocket housing 202 is tailored to cover a front sprocket 218 that is securely retained onto a drive shaft 222, and includes a plurality of teeth 220 that interface with the chain 204. Sprocket housing 202 may be mounted onto the frame of motorcycle 200, via mounting brackets 224, such that the chain 204 of the motorcycle 200 is guided through chain opening 216. Rubber mounts (not shown) may be used to help dissipate vibrations and shock.

In one exemplary embodiment, lubrication reservoir 110 is attached on top of the housing top wall 210 of sprocket housing 202 such that the lubricant exit hole 142 of reservoir 110 aligns with a housing aperture 143 formed through the housing top wall 210 of sprocket housing 202, as better illustrated in FIG. 4. The plurality of bristles of the lubrication applicator 134 extends through the housing aperture 143 with the application end 148 of lubrication applicator 134 positioned in continuous engagement with chain 204. The chain cleaning and lubricating device 100 is affixed to the sprocket housing 202 at a location selected to optimally align the application end 148 of the lubrication applicator 134 with chain 204. The optimal position is defined at a point where the chain 204 interfaces with front sprocket 218. Although the exemplary position is preferred, it is understood that the chain cleaning and lubricating device 100 may be attached anywhere on, or to the sprocket housing 202 as long as the lubrication applicator 134 continuously engages chain 204. It will be noted that each of the plurality of bristles of the lubrication applicator 134 has sufficient length to enable continuous engagement with chain 204 whether the control valve 138 is in an open or closed position. This provides the benefit of allowing the application end 148 to continuously engage chain 204 to constantly clean and remove any debris from the chain 204.

Control lever 206, as shown in FIG. 1, is selectively operated to create a tension force on control cable 130 to overcome the compression force applied by biasing member 136, thus opening control valve 138 and allowing lubricant 112 to flow out from lubrication reservoir 110. By gravity, chain lubricant 112 flows through housing aperture 143 in the form of lubricant droplets 150. The lubricant droplets 150 disperse onto the lubrication applicator 134 and flow downwards onto chain 204 lubricating the chain 204, as shown in FIG. 4. Conversely, releasing control lever 206 reduces the tension force applied on control cable 130, enabling biasing member 136 to force the control valve 138 in a closed position covering exit hole 142 and preventing any further lubricant drops 150 from flowing down the plurality of bristles of the lubrication applicator 134.

Figure 5:
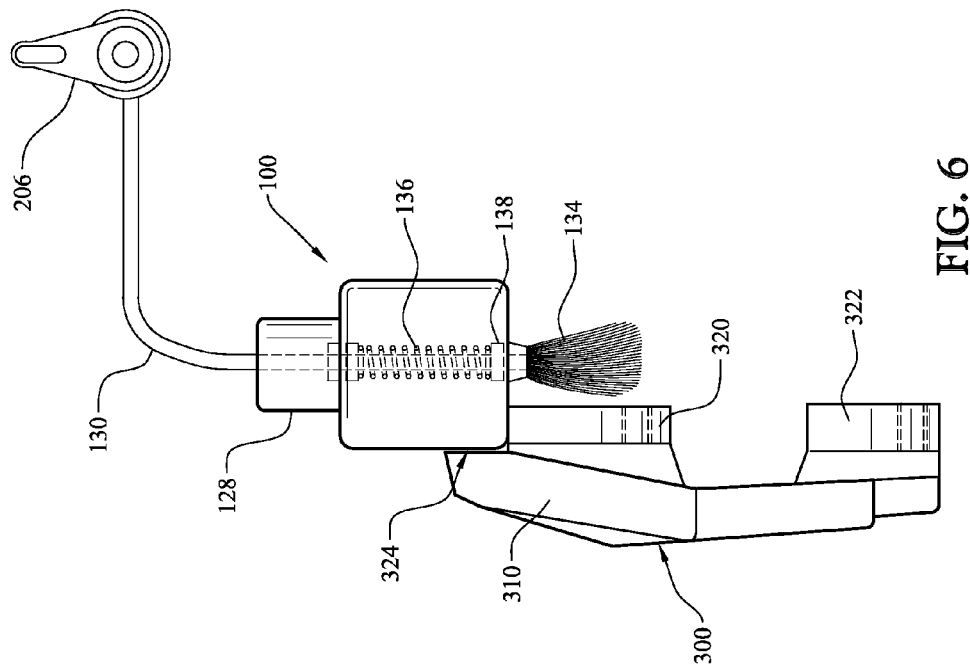
FIG. 5 presents a back view of the chain cleaning and lubricating device including an operating lever and control cable, showing the chain cleaning and lubricating device mounted to the sprocket housing of FIG. 1.
Figure 6:
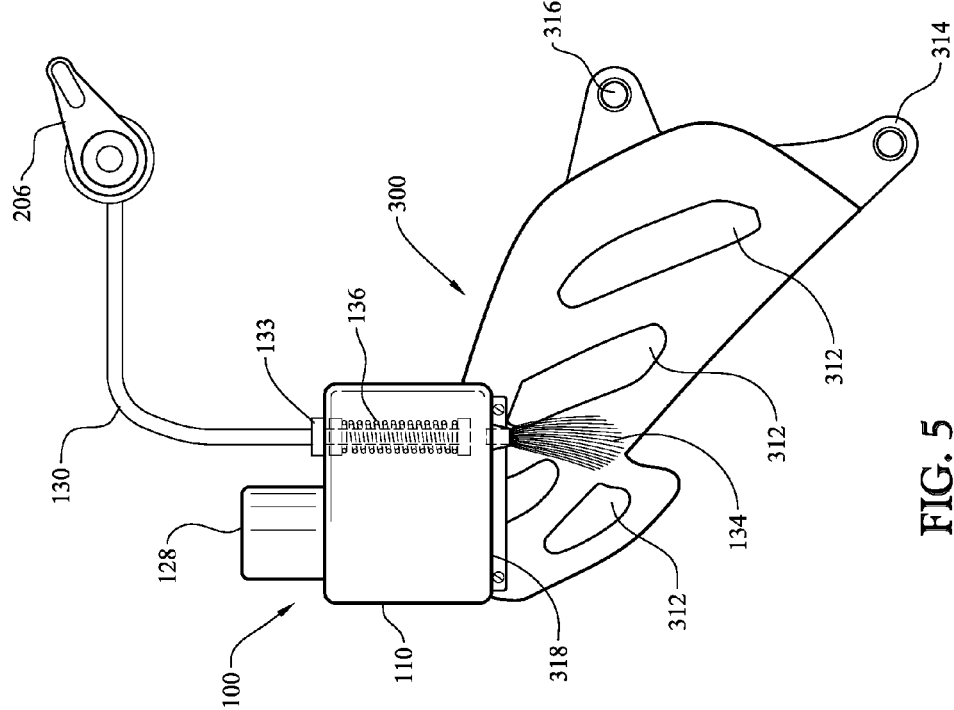
FIG. 6 presents a side view of the chain cleaning and lubricating device of FIG. 5.

Turning to FIGS. 5 and 6 there is shown a back and side view, respectively, of a chain cleaning and lubricating device 100 mounted onto a sprocket housing 300 comprising a different shape and configuration as that of sprocket housing 202. Sprocket housing 300 comprises a contoured body 310 having a plurality of openings 312 tailored to allow visual inspection of chain 204 and front sprocket 218 when the sprocket housing 300 is mounted onto motorcycle 200, as shown in FIG. 1. Sprocket housing 300 includes mounting brackets 314, 316 having apertures for receiving screws to securely attach the sprocket housing 300 to the frame of motorcycle 200. A reservoir bracket 318 may be provided to affix the chain cleaning and lubricating device 100 securely to the body of sprocket housing 300, via a pair of screws.

As noted herein, control valve 138, of chain cleaning and lubricating device 100, may be operated via, a vertical up and down motion. As illustrated in FIG. 5, the control lever 206 is operated to overcome the compression force of biasing member 136 to vertically move the control valve 138 upwards in an open position permitting chain lubricant to flow down from the plurality of bristles of the lubrication applicator 134. In one embodiment, lubrication applicator 134 may be attached to the lower sidewall 116 of lubrication reservoir 110 via, a ferrule rather than to the lower control valve surface 146 of control valve 138. A cable seal 133 secures the control cable 130 in place, and prevents debris from entering lubrication reservoir 110. The reservoir cap 128 is easily accessible and removed to refill the lubrication reservoir 110 with chain lubricant 112.

Sprocket housing 300 further includes side extensions 320, 322 to prevent contact with the rotational movements of the front sprocket 218 and chain 204, as shown in FIG. 6. Side extension 320 is integrally formed with body 310, of sprocket housing 300, to provide a seat area 324 to receive the chain cleaning and lubricating device 100. In use, sprocket housing 300 is mounted to the frame of motorcycle 200 covering the area where the chain 204 interfaces front sprocket 218. Lubrication applicator 134 is aligned on top of chain 204 where the plurality of bristles of the lubrication applicator 134 continuously engages chain 204. In an alternative embodiment, the chain cleaning and lubricating device 100 is may be designed as an integrated part of either sprocket housing 202, 300. Alternatively, the chain cleaning and lubricating device 100 may include a mounting bracket that is an integral part of or attached directly to, the lubrication reservoir 110.

An exemplary embodiment of the cleaning and lubricating device 100 provides a pivoting or vertically moving control valve 138 operated by control cable 130, via, control lever 206. It will be mentioned that the control valve 138, control lever 206 and control cable 130 may be replaced with a variety of different operative components that may include a solenoid valve, electrical switches such as toggle switches, pushbuttons, slide switches, electrical cabling, linear actuator, hydraulic cylinder, valves and controls, relays, or pneumatic cylinder, valves and controls. Further, although the exemplary embodiment presented herein illustrates a hand operated control lever 206, it is understood that the lever 206 may be replaced with a foot operated device, lever or switch.

During use of motorcycle 200, should the operator determine that the chain 204 requires lubrication, the rider selectively operates control lever 206 to create a tensile force within control cable 130. The tensile force of cable 130 overcomes the biased compression provided by biasing member 136, and forces the control valve 138 to open to dispense chain lubricant 112. Chain lubricant 112, in the form of lubricant droplets 150, flows, via gravity, along the lubrication applicator 134 onto chain 204. Thus, as the chain 204 interfaces with the front sprocket 148, the lubricant applicator 134 directs the flow of lubricant drops 150 onto the chain 204. The plurality of bristles of the lubrication applicator 134 continuously engages chain 204 continuously removing any debris or contaminants from chain 204. Once the rider determines that the lubrication process is complete, the rider simply releases the control lever 206 to close control valve 138 and cease dispensing chain lubricant 112 from the lubrication reservoir 110 of the cleaning and lubricating device 100. The chain cleaning and lubricating device 100 of the present invention provides a controlled flow of chain lubricant 112 to chain 204 of a chain driven vehicle, and continuously removes debris from the surface of the chain 204. An operator of motorcycle 200 can quickly and easily lubricate the chain 204 of the motorcycle 200 while riding the motorcycle, thereby eliminating the need of having to stop, and place the motorcycle 200 in a stationary position before lubricating the chain 204.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A chain cleaning and lubricating device comprising:
   a lubrication reservoir for containing a liquid lubricant, said lubrication reservoir including a first aperture having a removable closure, a cable aperture, and a lubrication aperture formed on a lower end of said lubrication reservoir;
   a control valve arranged within said lubrication reservoir to open and close said lubrication aperture;
   a lubrication applicator including a plurality of rigid bristles, said lubrication applicator aligned with said lubrication aperture to direct said liquid lubricant downwards, by gravity, along said plurality of rigid bristles when said control valve is opened; and
   a control cable having a distal end connected to a control lever, and a proximal end extending through said cable aperture and a bias member, and attached to said control valve,
   said control lever selectively operated to provide releasable tension on said control cable to open said control valve and provide controlled release of said liquid lubricant from said lubrication reservoir; wherein
   said control valve comprises any one of a pivoting motion, a rotational motion, a sliding motion, or a vertical up and down motion, and wherein said bias member is disposed within said lubrication reservoir and comprises a spring having a first end attached to said control valve, and a second end engaging an internal perimeter of said cable aperture.

2. The chain cleaning and lubricating device of claim 1, wherein said lubrication applicator is either attached to a lower surface of said control valve, or to a lower surface of said lubrication reservoir in coaxial alignment with said lubrication aperture.

3. The chain cleaning and lubricating device of claim 2, attached to a sprocket housing designed to cover a chain and drive sprocket of a motorcycle, said sprocket housing attached to said motorcycle such that said plurality of rigid bristles are oriented at a point where said chain interfaces with said drive sprocket and where said plurality of rigid bristles are in continuous engagement with said chain.

4. The chain cleaning and lubricating device of claim 3, wherein said control lever comprises a hand operated lever.

5. The chain cleaning and lubricating device of claim 4, wherein said control lever is securely attachable to handlebars of said motorcycle.

6. The chain cleaning and lubricating device of claim 2, wherein said lubrication reservoir comprises a translucent or transparent material to permit viewing of said liquid lubricant within said lubrication reservoir.

7. A chain cleaning and lubricating device attached to a sprocket housing including mounts for removable attachment to a frame of a motorcycle and positioned to cover a drive sprocket and a chain of said motorcycle, said chain cleaning and lubricating device comprising;
   a lubrication reservoir defining an interior volume for containing a chain lubricant, and including a fill aperture having a removable closure, a cable aperture, and an exit aperture;
   a control valve operatively disposed within said lubrication reservoir and operated to open and close said exit aperture;
   a lubrication applicator including a plurality of bristles coaxially aligned with said exit aperture to direct said chain lubricant downwards, by gravity, along said plurality of bristles when said control valve is opened to allow chain lubricant to pass through said exit aperture;
   a control lever attachable to said motorcycle; and
   a control cable having a distal end connected to said control lever, and a proximal end extending through said cable aperture and a bias member, and attached to said control valve,
   said control lever selectively operated to provide releasable tension on said control cable to open said control valve and provide controlled release of said chain lubricant from said lubrication reservoir, wherein
   said control valve comprises any one of a pivoting motion, a rotational motion, a sliding motion, or a vertical up and down motion, and wherein said bias member is disposed within said lubrication reservoir and comprises a spring having a first end attached to said control valve, and a second end engaging an internal perimeter of said cable aperture.

8. The chain cleaning and lubricating device of claim 7, wherein said lubrication applicator is either attached to a lower surface of said control valve, or to a lower surface of said lubrication reservoir in alignment with said exit aperture.

9. The chain cleaning and lubricating device of claim 8, wherein said sprocket housing is attached to said frame of said motorcycle so that said plurality of bristles are oriented at a point where said chain interfaces with said drive sprocket and where said plurality of bristles are in continuous engagement with said chain.

10. The chain cleaning and lubricating device of claim 9, wherein said control lever comprises a hand operated lever that is securely attachable to handlebars of said motorcycle.

11. The chain cleaning and lubricating device of claim 8, further including a cable seal having an opening for receiving said control cable therethrough, said cable seal insertable within said cable aperture.

12. The chain cleaning and lubricating device of claim 8, wherein said lubrication reservoir comprises a translucent or transparent material to permit viewing of said liquid lubricant within said lubrication reservoir.

13. A chain maintenance system for a chain having interconnecting links that interface with a drive sprocket of chain driven vehicles, said chain maintenance system comprising:
   a receptacle including a fill aperture having a removable closure, a cable aperture, and a lubrication aperture, said receptacle defined by a body having a top and bottom and an interior volume for storing a liquid lubricant;
   a valve operatively disposed within said receptacle and oriented to open and close said lubrication aperture;
   a plurality of bristles aligned with said lubrication aperture to direct said liquid lubricant downwards, by gravity, along said plurality of bristles when said valve is opened permitting said liquid lubricant to flow through said lubrication aperture;
   a control lever attachable to one of said chain driven vehicles;
   a control cable having a first end connected to said control lever, and a second end extending through said cable aperture and a bias member, and coupled to said valve, said control lever selectively operated to provide releasable tension on said control cable to operate said valve and provide controlled dispensing of said liquid lubricant from said receptacle, via said lubrication aperture; and
   wherein said receptacle is affixed to a sprocket housing that is attached to a frame of said one of said chain driven vehicles such that said plurality of bristles are oriented at a point where said chain interfaces with said drive sprocket and where said plurality of bristles are in continuous engagement with said chain, wherein said valve comprises any one of a pivoting motion, a rotational motion, a sliding motion, or a vertical up and down motion, and wherein bias member said is disposed within said receptacle and comprises a spring having a first end attached to said valve, and a second end engaging an internal perimeter of said cable aperture.

14. The chain maintenance system of claim 13, wherein said plurality of bristles are either attached to said valve, or to said bottom of said receptacle in coaxial alignment with said lubrication aperture.

15. The chain maintenance system of claim 14, wherein one of said chain driven vehicles comprises a motorcycle and said control lever comprises a hand operated lever that is securely attachable to handlebars of said motorcycle.

\* \* \* \* \*